United States Patent Office 2,704,331
Patented Mar. 15, 1955

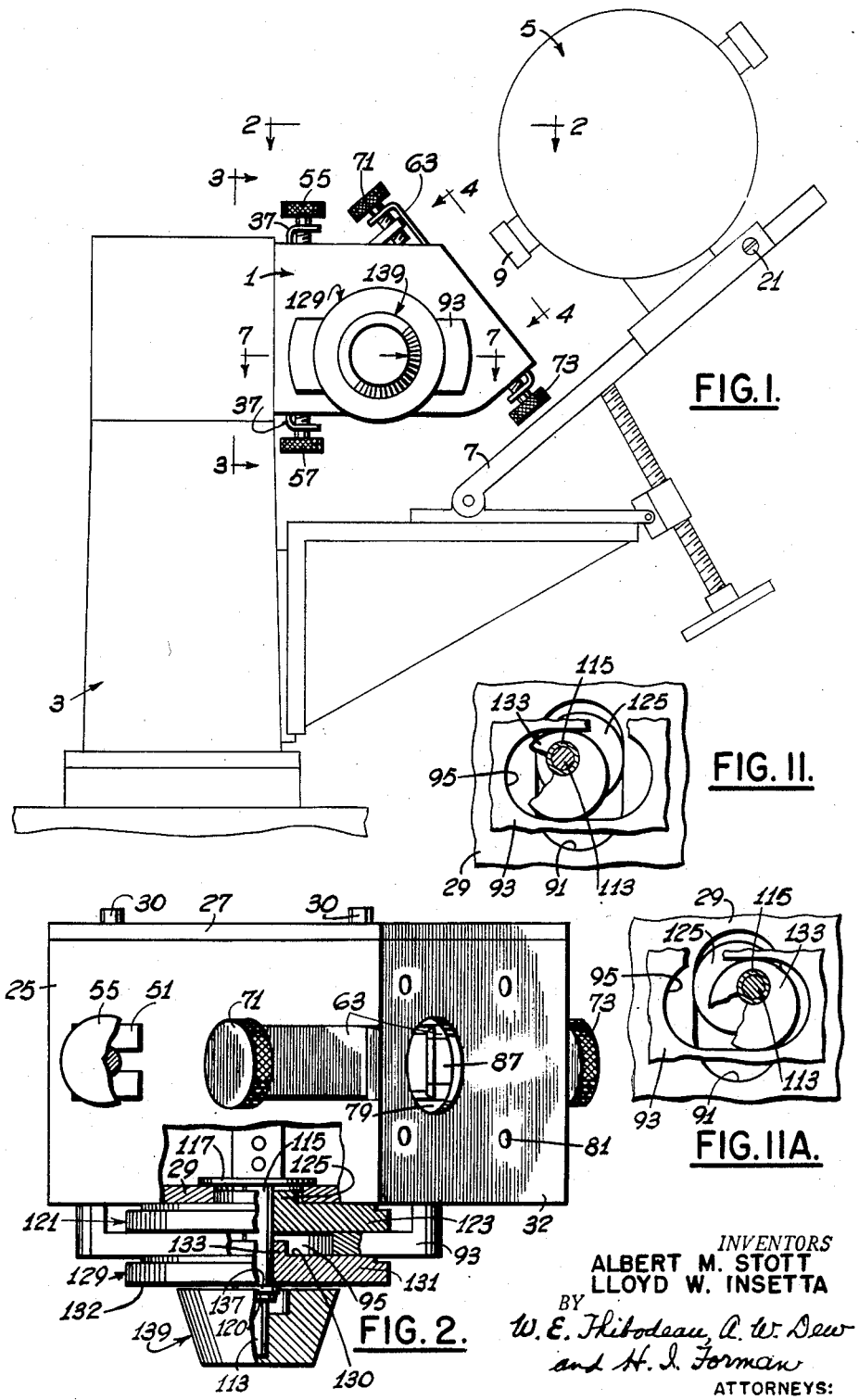

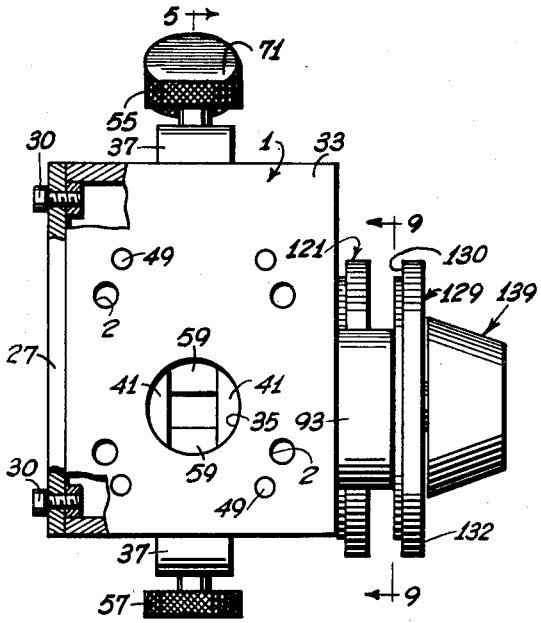
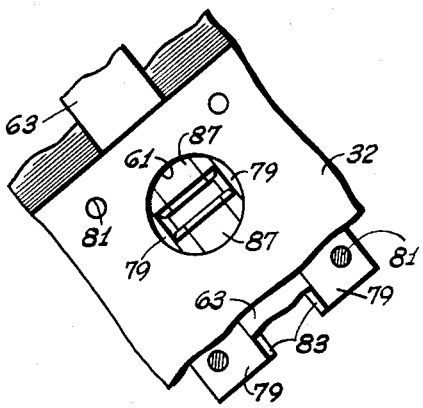
FIG. 3.
FIG. 4.
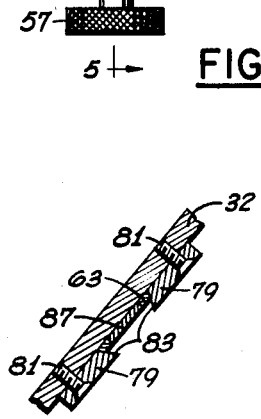
FIG. 6.
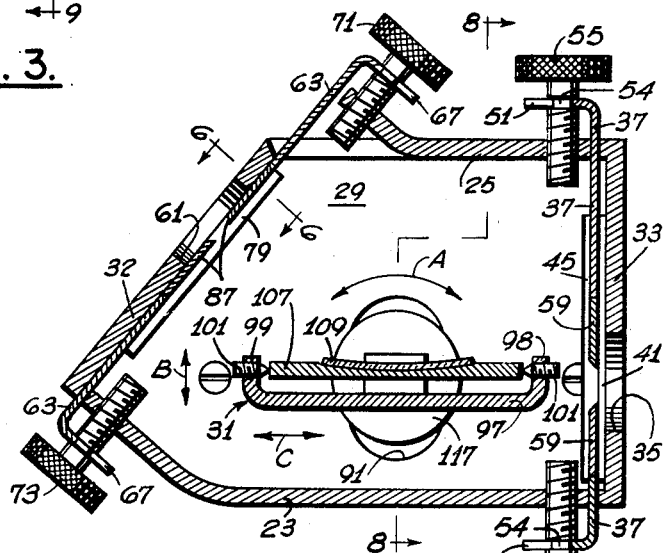
FIG. 5.
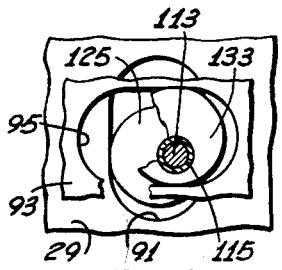
FIG. 11B.
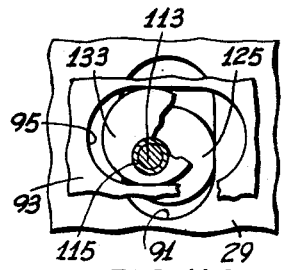
FIG. 11C.

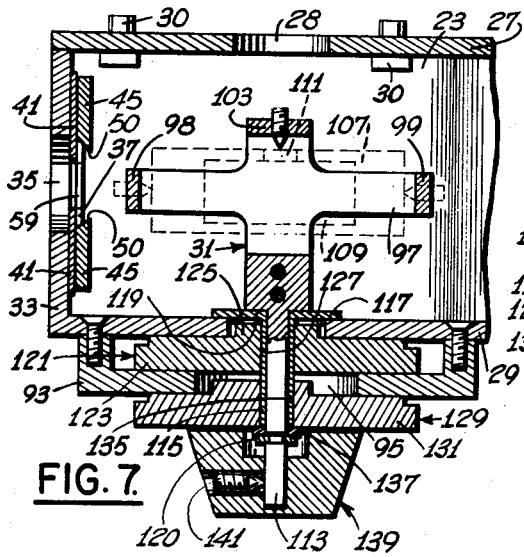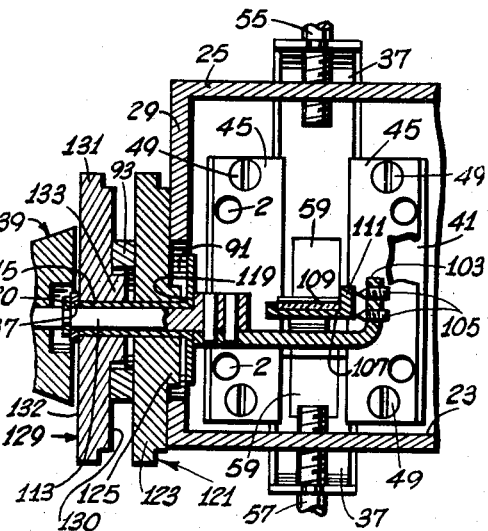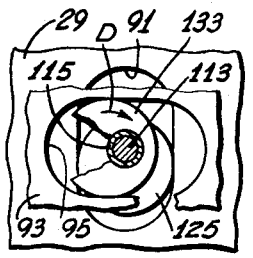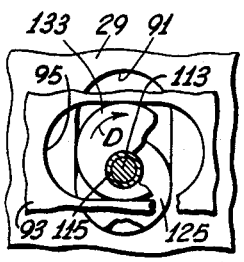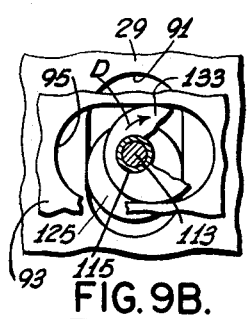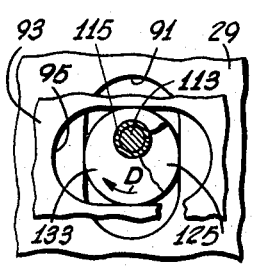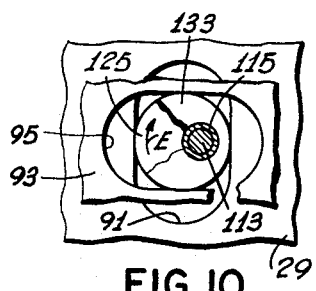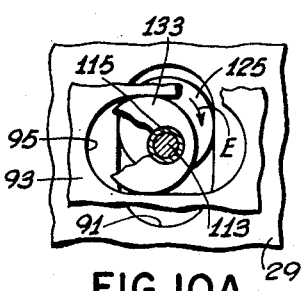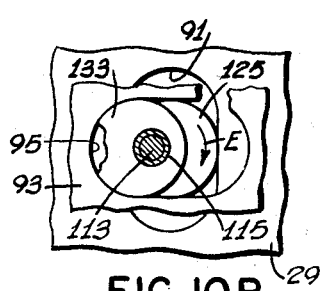

2,704,331

ADJUSTABLE MOUNT FOR X-RAY DIFFRACTION CRYSTAL

Albert M. Stott, Clifton Heights, and Lloyd W. Insetta, Philadelphia, Pa.

Application October 20, 1953, Serial No. 387,330

4 Claims. (Cl. 250—52)

(Granted under Title 35, U. S. Code (1952), sec. 266)

The invention described herein may be manufactured and used by or for the Government for governmental purposes without the payment of any royalty thereon.

This invention relates to monochromators and more particularly to monochromators for diffracting X-rays of varied wavelength.

In conducting X-ray diffraction studies, a monochromatic crystal box is mounted adjacent to an X-ray source. X-rays are passed through an adjustable aperture on the front face of the box to impinge on the surface of a crystal supported on a mount within the box; the crystal in turn re-directs an intense monochromatic radiation through a second adjustable aperture. The second adjustable aperture allows a ray of a particular wavelength to pass on to a specimen mounted inside an associated X-ray camera where a photographic film is exposed to the diffraction pattern. Formerly, a flat crystal was used to diffract the ray but the use of a curved crystal has since been found to produce more desirable results; the curved crystal produces a ray of increased intensity while scattered radiation, which tends to becloud the film is reduced.

When curved crystals are used for monochromatic purposes, however, it is necessary to adjust the position of the crystal for each ray of different wavelength in order to sharply focus the ray on the film and to produce a ray of maximum intensity. Accurate and rapid adjustment of the crystal is facilitated by utilizing a plurality of interconnected, but independently operated mechanisms which afford several crystal movements. By placing the adjustment controls externally of the monochromator box the necessary adjustments can be made with maximum protection against any scattered X-ray radiation which might otherwise be injurious to the operator.

It is, therefore, an object of this invention to provide a monochromator box having an improved adjustable crystal mount.

It is a further object of this invention to provide externally controlled operating mechanisms for adjusting particularly the position of a curved crystal mount which is supported internally of a monochromating box.

It is a still further object of this invention to provide an adjustable mount for accommodating X-ray, monochromating, crystals.

The foregoing, as well as other objects and advantages of this invention will become apparent from a study of the following specification, taken in conjunction with the accompanying drawings, wherein like characters of reference indicate corresponding parts throughout the several views and wherein:

Fig. 1 is a front elevational view showing a monochromator embodying the principles of this invention of this invention in conjunction with an X-ray source and a photographic camera, the latter being shown in outline form.

Fig. 2 is a plan view, taken along the line 2—2 of Fig. 1, partly broken away to show details of some parts;

Fig. 3 is a side elevational view, partly broken away, taken along the line 3—3 of Fig. 1, showing the aperture through which an X-ray enters the monochromator;

Fig. 4 is a plan view, taken along line 4—4 of Fig. 1, enlarged to show the details of the aperture through which the diffracted X-ray exits the monochromator;

Fig. 5 is a sectional view, taken along line 5—5 of Fig. 3, showing the interior of the monochromator;

Fig. 6 is a sectional view, taken along line 6—6 of Fig. 5, showing details of the inlet aperture;

Fig. 7 is a sectional view, taken along line 7—7 of Fig. 1, showing the interior of the monochromator together with the crystal mount and adjustment mechanism therefor;

Fig. 8 is a sectional view, partly broken away, taken along line 8—8 of Fig. 5;

Fig. 9 is a diagrammatic view, with parts broken away, as seen along line 9—9 of Fig. 3, showing the crystal mount vertical adjusting mechanism;

Figs. 9A, 9B and 9C are views, similar to Fig. 9, showing various positions of adjustment of the parts;

Figs. 10, 10A and 10B are views, similar to Fig. 9, showing the horizontal adjusting mechanism for the crystal mount in various selective positions; and Figs. 11, 11A, 11B and 11C are views, similar to Fig. 9, showing the adjustment mechanism, respectively, in the four extremities of its vertical and horizontal movements.

Referring to the drawings and particularly to Fig. 1, a preferred form of monochromator embodying the principles of this invention, generally designated by the reference numeral 1, is shown attached to and in operative association with an X-ray source 3 and an X-ray camera 5. In general, the apparatus operates in the following manner; the X-ray generated by the source 3 is admitted to the interior of the monochromator by means of an adjustable inlet aperture, diffracted by a monochromating crystal, exited from the monochromator by means of an adjustable outlet aperture and impinged upon a spectro-photometer specimen located within the X-ray camera 5. An adjustable bracket 7 is provided for the camera 5 such that the camera can be positioned to receive the diffracted ray perpendicularly through the camera entrance slit 9.

Referring more particularly to Figs. 2 to 8 of the drawings, the monochromator 1 is shown to resemble a hollow housing having a bottom 23 and a substantially parallel top 25. The sides 27, 29 of the monochromator are also parallel, one side 27 of which is removably fastened by means of screws 30 to provide access to the interior of the box when desired. A small access opening 28 is also provided in the removable side 27 for making minor adjustments. The other side wall 29 supports the crystal mount, generally designated by the reference numeral 31 in Fig. 5, and its related adjustment mechanism hereinafter described. One end wall 33 is perpendicular to the top 25 and bottom 23 and has bores 2 for accommodating bolts for attaching the unit to the X-ray source 3; the other end wall 32 is obliquely related to the top and bottom.

An opening 35 is provided in the perpendicular end wall 33 adjacent to the lower end thereof. As shown in Figs. 5, 7 and 8, the size of the passageway into the box through the opening 35 is made adjustable by a pair of plates 37, which slide between masking elements 41 and the converging sides of a pair of stays 45. When connected to the end wall 33 by screws 49, each masking element together with its associated stay forms a groove 50 in which the pair of plates 37, 39 are slidably mounted, as shown particularly in Fig. 7. The outer ends of each plate are turned out to provide bifurcated flanges 51 which rotatably engage a reduced shank portion 54 of a related adjusting thumb screw 55, 57. The thumb screws are threaded into similarly threaded openings respectively provided in the top and bottom walls of the box. By virtue of the rotatable engagement of the bifurcated plate flanges 51 with the shanks of the thumb screws, rotation of the thumb screws effects longitudinal movement of the plates 37 within the associated grooves 50, whereby the distance between the adjacent inner ends of the plates 37 may be varied. Lead inserts 59 are located at the inner adjacent ends of the sliding plates 37 to prevent scattered radiations from entering the monochromator and to provide, together with the side masking elements 41, a sharply defined inlet aperture. It will be readily recognized that the adjustment of the size and location of this aperture, relative to the opening 35 in the end wall 33, is effected by rotation of the associated thumb screws 55, 57.

An outlet opening 61, similar to the inlet opening 35 in the perpendicular end wall 33, is provided in the inclined end wall 31. An arrangement similar to the adjustable opening mechanism for the inlet opening is provided for the outlet opening using a pair of sliding plates 63 having turned in bifurcated flanges 67 at their outer ends, which flanges rotatably engage one of a pair of adjustment thumb screws 71, 73. The associated converging sides of a pair of stays 79, attached to the inclined end wall 31 by screws 81, form grooves 83 in which the plates 63 are slidably mounted. Lead inserts 87, positioned in the inner ends of the plates 63, 65, delimit a sharply defined outlet aperture. The arrangement is such as to enable the distance between the adjacent ends of the plates 63 to be varied to provide an adjustable outlet aperture for the rays diffracted within the monochromator.

Referring to Fig. 5, the crystal mount supporting wall 29 is provided with a vertically elongated opening 91. Supported on the outer side of and spaced from the side wall 29 is a spacer plate 93 provided with a horizontally elongated opening 95 (Fig. 7). The elongated openings 91, 95 function to receive cams used to control the position of the crystal mount 31 as will be hereinafter described.

The crystal mount 31 includes a longitudinally extending bed 97 terminating in upwardly extending flanges 98, 99 through each of which is threaded a set screw 101. Midway between the longitudinal extremities of the bed 97 is another upwardly extending flange 103 through which is threaded a pair of inwardly directed and vertically spaced set screws 105, as shown in Fig. 8. The crystal base 107, to which is attached the curved crystal 109, is mounted between the three upwardly extending flanges 98, 99, 103 and is positioned relative to the bed 97 by means of the associated set screws 101, 105. The longitudinally spaced set screws 101 provide a longitudinal pivot about which the crystal base 107 may be rotated, whereas the vertically spaced set screws 105, acting against the side 111 of the base 107, provide for leveling the pivotally mounted base 107 relative to the bed 97.

The position of the crystal mount 31 with respect to the interior of the monochromator, which influences the focus of the diffracted rays, is controlled by the orientation of an outwardly extending control shaft 113. The control shaft is attached midway between the longitudinal extremities of the bed 97 on the side opposite to the upwardly extending flange 103 and is arranged to extend laterally therefrom. The focusing condition requires the curvature of the crystal to lie in the same circular periphery as the source and focus point. It is, therefore, necessary to provide sufficient adjustability to permit the crystal mount to be moved to the optimum position for a ray of a certain wavelength. By virtue of three associated but independently operated mechanisms the pivot shaft and attached bed 97 with the crystal mounted thereon, may be (1) rotated about its axis (as shown by arrow A in Fig. 5), (2) moved vertically relative to the bottom 23 of the monochromator (as shown by arrow B), or (3) moved horizontally relative to the end walls 31, 33 (as shown by arrow C) to obtain sharp focus and proper deflection of the diffracted rays. The controls for making these adjustments are conveniently placed on the exterior of the enclosure such that accurate and rapid adjustments may be made by the operator without danger of injury from scattered radiation.

The pivot shaft 113, which is rotatably mounted and partially enclosed within a sleeve 115, extends outwardly through the opening 91 in the side wall 29 of the monochromator. A retaining collar 117, formed at the inner end of the sleeve 115, and rotatably abutting a shoulder 119 adjacent the inner end of the shaft 113, is of sufficient size to engage the bordering interior surfaces of the opening 91 in the side wall 29 to preclude outward movement of the shaft 113, as shown in Fig. 7. A retaining ring 120 disposed around the shaft 113 and in proximity to the outer end of the sleeve 115 prevents inward movement of the shaft relative to the sleeve 115. A horizontal control knob 121 is rotatably mounted on the sleeve 115 and occupies the space between the side wall 29 and the attached spacer plate 93. The horizontal control knob includes a manually operated circular disk portion 123, a smaller, eccentrically arranged, circular cam portion 125, and a shaft receiving opening 127 extending through both the disk and cam portions at the center of the disk 123. The cam 125, which has a diameter substantially equal to the width of the vertically elongated opening 91 in the side wall 29, engages the sides of the opening such that horizontal movement of the cam is prevented while limited vertical movement is permitted. It will, therefore, be recognized that manual rotation of the disk 123 will, due to the eccentric relationship of the shaft 113 to the cam portion 125, introduce horizontal motion to the shaft 113.

A vertical control knob 129, which is similar to the horizontal control knob 121, is also rotatably mounted on the sleeve 115 and includes a manually operated circular disk portion 131, an eccentrically mounted, circular cam portion 133, and a shaft receiving opening 135 which extends through both the disk and cam portions at the center of the disk 131. The vertical control knob 129 is placed on the sleeve 115, outwardly of the horizontal control knob 121, with the inner side 130 of the disk 131 in engagement with the outer side of the spacer plate 93 and the outer side 132 of the disk 131 in abutting engagement with a retaining collar 137 disposed around the shaft 113 and between the retaining ring 120 and the outer extremity of the sleeve 115. The eccentric cam 133, which has a diameter substantially equal to the width of the horizontally elongated opening 95 engages the sides of the opening such that vertical movement of the cam is prevented while limited horizontal movement is permitted. It will thus be recognized that manual rotation of the vertical control disk 131 will, due to the eccentric mounting of the cam 133 on the shaft 113, introduce vertical motion to the shaft 113. A pivot control knob 139 is connected directly to the outer end of the pivot shaft 113 by means of a set screw 141 such that rotation of this knob 139 will cause rotation of the crystal mount 31 about the axis of the shaft 113. Due to the rotatable mounting of the shaft 113 in the sleeve 115, the pivot control knob 139 may be actuated without altering the horizontal and vertical control settings.

Referring to Fig. 9 of the drawings, the association of the horizontal and vertical control mechanism is shown in detail. For purposes of illustration the horizontal and vertical control cams 125, 133 are shown in position in the associated opening 91, 95 of the side wall 29 and spacer plate 93, respectively, with the horizontal and vertical control disks 123, 131 removed. As the vertical control cam 133 is rotated (in the direction indicated by the arrow D) from the position shown in Fig. 9 to the respective positions shown in Figs. 9A, 9B and 9C, the cam 133 moves horizontally in the elongated opening 95 but the shaft 113 is restricted against horizontal movement by the engagement of the horizontal control cam 125 with the side walls of its vertically elongated opening 91. The rotation and horizontal movement of the vertical control cam 133 is, therefore, translated into vertical movement of the pivot shaft 113, as shown. It will be noted that continuous rotation of the vertical control cam 133 will result in a reciprocating vertical movement of the pivot shaft 113, Figs. 9A and 9C illustrating the lower and upper limits of such movement.

Figs. 10, 10A and 10B illustrate the manner in which horizontal adjustment of the crystal mount is effected. This adjustment is made in a manner similar to the vertical adjustment heretofore described. Rotation of the horizontal control cam 125 (in the direction of arrow E) causes the pivot shaft 113 to move horizontally under guidance of the vertical control cam 133, which is restricted against vertical movement as it moves within the horizontally elongated opening 95 in the spacer plate 93. Thus, vertical movement of the horizontal control cam 125 is translated into horizontal movement of the pivot shaft 113. The extent of the horizontal movement in either direction is represented by Figs. 10 and 10B. It is to be noted that both the horizontal and vertical control knobs may be rotated in either direction to obtain the desired adjustment; the direction of rotation indicated by the arrows in the several figures has been merely for purposes of illustration.

By virtue of the interconnected but independently operated control mechanisms for effecting each of the three movements, the crystal mount 31 has a high degree of adjustability, specifically the crystal mount may be (1) rotated about its pivot axis by the pivot control knob 139, (2) moved vertically by rotation of the vertical control knob 129, and (3) moved horizontally by rotation of the horizontal control knob 121. Figs. 11, 11A, 11B and 11C are illustrative of the wide degree of adjustability afforded the crystal mount. Fig. 11 shows the maximum upward movement of the shaft to the left (as viewed) and Fig. 11A shows the maximum upward movement to the right. Fig. 11B illustrates the maximum downward movement to the right, whereas Fig. 11C shows the maximum downward movement to the left.

In normal operation, the monochromator 1 is placed in association with the X-ray source 3 as shown in Fig. 1. The curved crystal 109 and its base 107 are then placed on the crystal mount 31 in the prescribed manner. After positioning the crystal on the mount, minor adjustments of the crystal can then be made through the access opening 28 in the side wall 27. In order to visually observe the focus of the X-rays which are emitted by the source 3 and diffracted through the monochromator, the X-ray camera is temporarily replaced with a fluorescent screen (not shown). The fluorescent screen affords a means whereby the otherwise invisible rays may be observed as they are brought into sharp focus by manipulation of the respective vertical, horizontal and pivot control knobs to vary the position of the crystal.

Once the rays are brought into shap focus on the screen, the inlet aperture is adjusted by means of the thumb screws 55, 57 to exclude unwanted rays from the monochromator. The outlet aperture is similarly adjusted by means of the thumb screws 71, 73 to provide a sharply defined diffracted ray pattern and to reduce the emission of scattered radiations. These adjustments are also facilitated by the fluorescent screen which permits a constant visual observation of the pattern.

Having thus focused the emitted rays by adjustment of the crystal mount 31 and having sharply defined the emissions by adjustment of the inlet and outlet apertures, the fluorescent screen is then replaced by the X-ray camera 5. By then placing the film and specimen within the camera, and adjusting the camera in a customary manner, the apparatus is ready for operation.

It will become obvious to those persons skilled in the art that many other and different arrangements may be used within the purview of this invention. It is to be understood that the form of the invention herewith shown and described is to be taken as the preferred example of the same and that changes in the shape, size and arrangement of the parts may be resorted to without departing from the spirit of the invention. Similarly, the novel adjustment mechanism herein shown, in conjunction with a crystal mount for monochromators, is not limited thereto, but is applicable to other situations requiring similar adjustments. In this same respect, the adjustment mechanism may be altered to eliminate the pivotal movement therefrom, for special applications. It is, therefore, desired that the particular form disclosed be taken as illustrative and not as limiting. We, furthermore, do not wish to be limited beyond the limitations which may be imposed by the following claims.

We claim:

1. In combination with a mount having a base and a pivot shaft, mechanism for adjusting the position of said mount comprising: a fixed member having portions defining a first elongated slot, a second fixed member having portions defining a second slot elongated in a direction transversely of the elongated direction of said first slot, a first circular cam eccentrically and rotatably mounted on said pivot shaft in partial engagement with the portions defining said first slot, a second circular cam eccentrically and rotatably mounted on said pivot shaft in partial engagement of each of said cams substantially preventing movement of each of said cams transversely of their respective slots while permitting movement of each of said cams longitudinally of their respective slots; first means for rotating said pivot shaft about its axis, second means for rotating said first cam and third means for rotating said second cam; each of said means being operative independently of each of said other means.

2. A mechanical movement comprising: a first member defining an elongated slot, a second member defining an elongated slot extending in a direction normal to the elongated direction of said first slot; a first cam adapted for rotational and longitudinal movement disposed within the slot formed by said first member, a second cam adapted for rotational and longitudinal movement disposed within the slot formed by said second member; each of said cams eccentrically and rotatably engaging a common shaft; whereby rotation of said first cam will effect a first movement of said shaft in the direction of said second slot, and rotation of said second cam will effect a second movement of said shaft in the direction of said first slot.

3. A mechanical movement as set forth in claim 2, including means for rotating said shaft relative to said first and second cams, whereby said shaft may be rotated about its axis independently of each of said movements.

4. Apparatus for monochromatically diffracting X-rays, comprising: a housing, a portion of said housing having an opening defining an inlet aperture, another portion of said housing having an opening defining an outlet aperture, a crystal mount within said housing adapted to support an X-ray diffraction crystal for receiving X-rays transmitted through said inlet aperture and diffracting them through said outlet aperture, and means for adjusting the position of said mount, said adjusting means comprising a first means associated with said housing and defining a first elongated slot, a second means associated with said housing and defining a second elongated slot extending in a direction normal to the elongated direction of said first slot, said first means and said second means being juxtaposed and disposed parallel to each other, a first cam adapted for rotational and longitudinal movement disposed within the slot formed by said first means, a second cam adapted for rotational and longitudinal movement disposed within the slot formed by said second member, each of said cams eccentrically and rotatably engaging a portion of said mount, whereby rotation of said first cam will effect movement of said mount in the direction of said second slot and rotation of said second cam will effect movement of said mount in the direction of said first slot, thereby adjustably positioning said mount relative to said apertures.

References Cited in the file of this patent

UNITED STATES PATENTS

| Number | Name | Date |
|---|---|---|
| 86,098 | Parker | Jan. 19, 1869 |
| 450,234 | Johnson | Apr. 14, 1891 |
| 472,126 | Johnson | Apr. 5, 1892 |
| 597,470 | Norden | Jan. 18, 1898 |
| 598,253 | McKee | Feb. 1, 1898 |
| 736,847 | Harling | Aug. 18, 1903 |
| 2,386,785 | Friedman | Oct. 16, 1945 |
| 2,392,528 | Fankuchen | Jan. 8, 1946 |
| 2,430,969 | Young | Nov. 18, 1947 |
| 2,445,132 | Berman | July 13, 1948 |
| 2,514,382 | Friedman et al. | July 11, 1950 |
| 2,635,192 | Cordovi | Apr. 14, 1953 |